United States Patent
Usui

(10) Patent No.: US 10,189,163 B2
(45) Date of Patent: Jan. 29, 2019

(54) CONTROL APPARATUS, CONTROL SYSTEM, CONTROL METHOD, AND STORAGE MEDIUM

(71) Applicant: Sharp Kabushiki Kaisha, Sakai, Osaka (JP)

(72) Inventor: Daisuke Usui, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/686,386

(22) Filed: Aug. 25, 2017

(65) Prior Publication Data
US 2018/0065255 A1 Mar. 8, 2018

(30) Foreign Application Priority Data

Sep. 6, 2016 (JP) .................. 2016-173791

(51) Int. Cl.
| | |
|---|---|
| B25J 13/00 | (2006.01) |
| B25J 5/00 | (2006.01) |
| G06F 21/00 | (2013.01) |
| G06F 19/00 | (2018.01) |
| H04Q 5/22 | (2006.01) |
| G05B 19/00 | (2006.01) |
| B25J 9/16 | (2006.01) |
| B25J 19/06 | (2006.01) |

(52) U.S. Cl.
CPC .......... *B25J 13/006* (2013.01); *B25J 9/1674* (2013.01); *B25J 19/06* (2013.01)

(58) Field of Classification Search
CPC ... B25J 13/00; B25J 5/00; B25J 13/006; B25J 9/1674

USPC .......... 340/12.27, 10.1–10.5; 700/245, 260, 700/250, 255, 264, 83, 79; 318/568.11, 318/568.12
See application file for complete search history.

(56) References Cited

U.S. PATENT DOCUMENTS 7,164,971 B2 * 1/2007 Ferla ................ B25J 13/06
  700/247
7,577,497 B2 * 8/2009 Johannessen .......... B25J 9/1674
  318/568.11

(Continued)

FOREIGN PATENT DOCUMENTS

| JP | 2006-341356 A | 12/2006 |
| JP | 2014-184519 A | 10/2014 |

*Primary Examiner* — Nam V Nguyen
(74) *Attorney, Agent, or Firm* — Keating & Bennett, LLP

(57) ABSTRACT

A control apparatus includes a control signal generation unit which generates a control signal Sct, a transmission unit, and a communication switch. The transmission unit transmits a transmit signal St including the control signal Sct to a control target via wireless communication. The communication switch has a first communication disabled state and a communication enabled state, makes a transition from the first communication disabled state to the communication enabled state by a maneuver from outside, and returns to the first communication disabled state when released from the maneuver. Also, the communication switch enables wireless communication by the transmission unit during a period of being kept in the communication enabled state and disables wireless communication by the transmission unit during a period of being kept in the first communication disabled state.

2 Claims, 5 Drawing Sheets

(56) References Cited

U.S. PATENT DOCUMENTS

| | | | | |
|---|---|---|---|---|
| 7,933,667 | B2 * | 4/2011 | Sjoberg | ................. B25J 13/065 |
| | | | | 318/567 |
| 8,046,104 | B2 * | 10/2011 | Sjoberg | ................. B25J 9/1674 |
| | | | | 318/569 |
| 8,370,959 | B2 * | 2/2013 | Gunadisastra | .......... G06F 21/34 |
| | | | | 713/320 |
| 8,660,690 | B2 * | 2/2014 | Tani | ..................... B25J 9/1674 |
| | | | | 700/245 |
| 9,965,598 | B2 * | 5/2018 | Tegreene | ................. A61B 5/16 |
| 2006/0279245 | A1 * | 12/2006 | Hashimoto | ............ B25J 9/1674 |
| | | | | 318/568.12 |
| 2016/0193730 | A1 * | 7/2016 | Kawase | ................. B25J 9/1674 |
| | | | | 700/249 |

* cited by examiner

CONTROL APPARATUS, CONTROL SYSTEM, CONTROL METHOD, AND STORAGE MEDIUM

BACKGROUND

1. Field

The present disclosure relates to a technique for ensuring operation safety of a control target such as a monitoring robot.

2. Description of the Related Art

There is a technique for controlling a control target such as a monitoring robot via wireless communication by using a control apparatus such as a remote controller. In the technique of this type, the control apparatus may be provided with an emergency stop switch to improve operation safety of the control target, as suggested in, for example, Japanese Unexamined Patent Application Publication Nos. 2006-341356 and 2014-184519.

However, in related art, a user has to determine whether misoperation of the control target has occurred and press the emergency stop switch based on the user's own determination, thereby forcibly stopping the operation of the control target. Thus, if some external force is added to the control apparatus to cause misoperation of the control target under a situation not intended by the user, the misoperation of the control target is not recognized by the user, and therefore it is difficult to forcibly stop the operation of the control target.

In recent years, the use of a robot such as a monitoring robot has been increasing, and an improvement in operation safety of the robot has been strongly desired.

SUMMARY

It is desirable to provide a technique capable of improving operation safety of a control target.

A control apparatus according to the present disclosure includes a control signal generation unit which generates a control signal, a transmission unit, and a communication switch. The transmission unit transmits a transmit signal including the control signal to a control target via wireless communication. The communication switch has a first communication disabled state and a communication enabled state, makes a transition from the first communication disabled state to the communication enabled state by a maneuver from outside, and returns to the first communication disabled state when released from the maneuver. The communication switch enables wireless communication by the transmission unit during a period of being kept in the communication enabled state, and disables wireless communication by the transmission unit during a period of being kept in the first communication disabled state.

A control system according to the present disclosure includes the above-described control apparatus and a control target to be controlled by the control apparatus. The control apparatus further includes an additional signal generation unit, and the additional signal generation unit generates an additional signal corresponding to the control signal generated by the control signal generating unit. The transmission unit of the control apparatus transmits the transmit signal including the control signal and the additional signal corresponding to the control signal to the control target via wireless communication.

The control target includes an operation unit, a reception unit, an operation control unit, and a safety control unit. The reception unit receives the transmit signal from the transmission unit of the control apparatus and outputs a receive signal. The operation control unit controls the operation unit based on a control signal included in the receive signal as corresponding to the control signal in the transmit signal. The safety control unit determines whether to use the control signal in the receive signal for controlling the operation unit, based on an additional signal included in the receive signal as corresponding to the additional signal in the transmit signal, and forcibly controls operation of the operation unit when determining not to use the control signal.

A control method according to the present disclosure includes a generation step, a transmission step, an output step, an operation control step, and a safety control step. In the generation step, a control signal and an additional signal corresponding to the control signal are generated. In the transmission step, a transmit signal including the control signal and the additional signal corresponding to the control signal is transmitted to a control target via wireless communication. In the output step, the transmit signal is received, and a receive signal is outputted. In the operation control step, the control target is controlled based on a control signal included in the receive signal as corresponding to the control signal in the transmit signal. In the safety control step, based on an additional signal included in the receive signal as corresponding to the additional signal in the transmit signal, whether to use the control signal in the receive signal for controlling the control target is determined. When it is determined not to use the control signal, operation of the control target is forcibly controlled.

A storage medium according to the present disclosure stores a control program to be executed by a control target includes an output step, an operation control step, and a safety control step. In the output step, a receive signal is outputted when a transmit signal including a control signal and an additional signal corresponding to the control signal is received. In the operation control step, the control target is controlled based on a control signal included in the receive signal as corresponding to the control signal in the transmit signal. In the safety control step, based on an additional signal included in the receive signal as corresponding to the additional signal in the transmit signal, whether to use the control signal in the receive signal for controlling the control target is determined. When it is determined not to use the control signal, operation of the control target is forcibly controlled.

DESCRIPTION OF THE EMBODIMENTS

[1] First Embodiment

Figure 1:
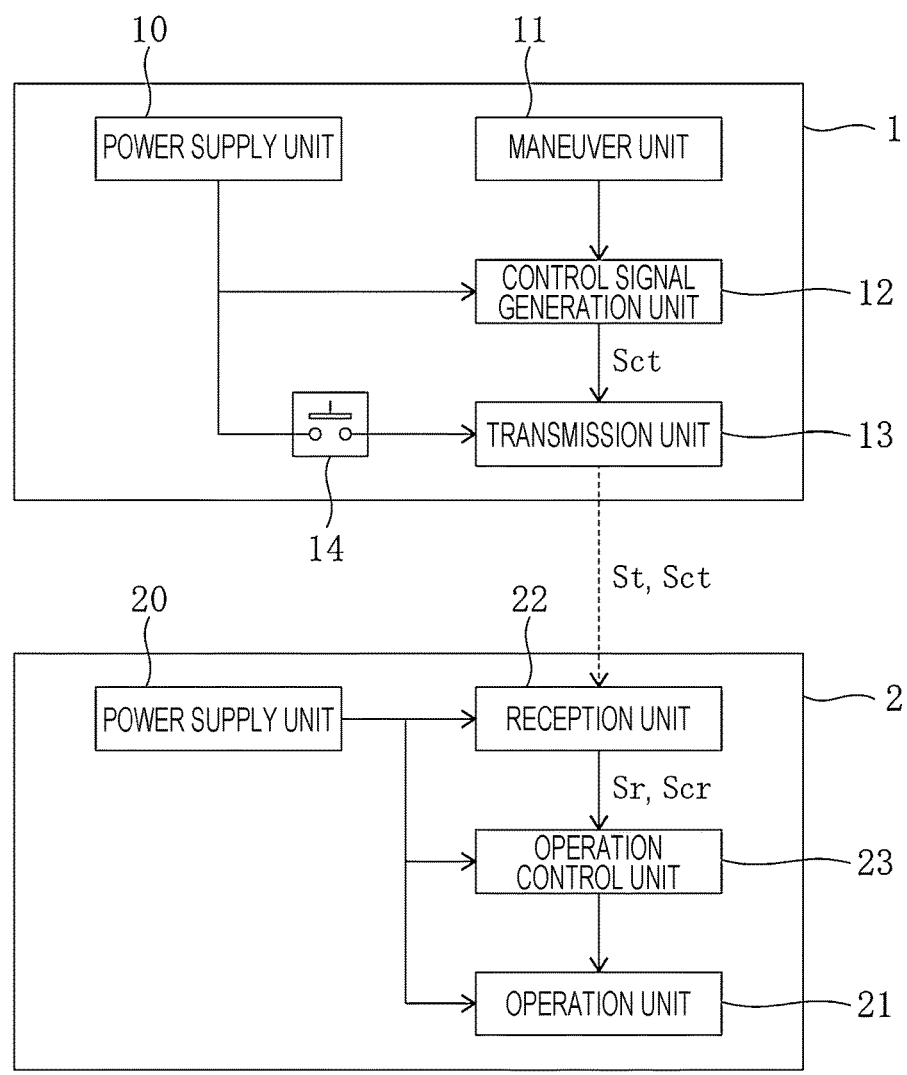
FIG. 1 is a block diagram conceptually depicting a control system according to a first embodiment.

FIG. 1 is a block diagram conceptually depicting a control system according to a first embodiment. As depicted in FIG.

1, the control system includes a control apparatus 1 and a control target 2 to be controlled by the control apparatus 1. The control target 2 is a robot, for example, a monitoring robot or a transfer robot. The control target 2 may be any of various electrical appliances, apparatuses, and so forth which perform some operation. In the control target 2, operation safety may be desired.

<Control Apparatus>

The control apparatus 1 includes a power supply unit 10, a maneuver unit 11, a control signal generation unit 12, a transmission unit 13, and a communication switch 14. The power supply unit 10 supplies electric power to each unit of the control apparatus 1. In the present embodiment, the power supply unit 10 supplies electric power to the control signal generation unit 12 and the transmission unit 13.

Figure 2:
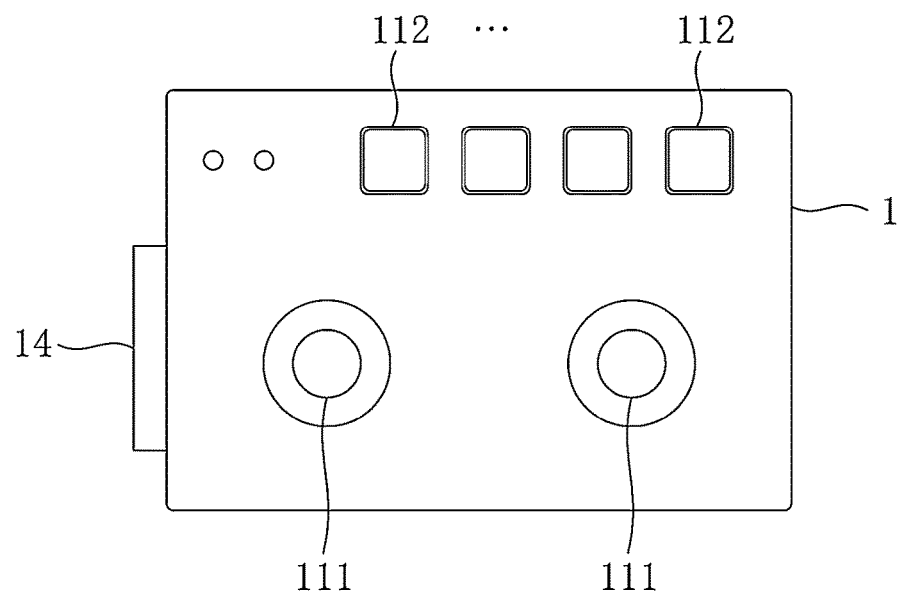
FIG. 2 is a plan view of an example of the outer appearance of a control apparatus included in the control system.

FIG. 2 is a plan view of an example of the outer appearance of the control apparatus 1. In this example, the maneuver unit 11 is configured of paired left and right maneuvering levers 111 and four maneuvering switches 112. Note that the maneuver unit 11 is not limited to this but may include various user interfaces, such as a touch panel, for use in maneuvering the control target 2.

The control signal generation unit 12 generates a control signal Sct in accordance with the maneuver in the maneuver unit 11. Specifically, the control signal generation unit 12 converts an analog signal obtained from the maneuver unit 11 into a digital signal to generate the control signal Sct. More specifically, the control signal generation unit 12 generates, as the control signal Sct, a digital signal including command data reflecting all maneuver states of, for example, the maneuvering levers 111 and the maneuvering switches 112 in the maneuver unit 11. Thus, if the structure of the maneuver unit 11 becomes complex as the operation of the control target 2 becomes complex and sophisticated, the length of the data string of the control signal Sct (series of data) generated by the control signal generation unit 12 becomes increased.

The transmission unit 13 transmits a transmit signal St including the control signal Sct to the control target 2 via wireless communication. Specifically, the transmission unit 13 transmits the transmit signal St as complying with communication standards for use. Here, the transmission unit 13 transmits the transmit signal St (including the control signal Sct) as divided into a plurality of packets (data communication units defined by the communication standards for use). As the length of the data string of the control signal Sct is increased, the number of packets for transmission of the control signal Sct is increased. As the communication standards, any of various wireless communication standards (such as IEEE 802.11, Bluetooth®, and Zigbee) can be used.

The communication switch 14 has a first communication disabled state and a communication enabled state, makes a transition from the first communication disabled state to the communication enabled state by a maneuver from outside, and returns to the first communication disabled state when released from the maneuver. Here, the first communication disabled state is a state that can be taken by the communication switch 14 and is set to disable wireless communication by the transmission unit 13. The communication enabled state is a state that can be taken by the communication switch 14 and is set to enable wireless communication by the transmission unit 13.

In the present embodiment, the communication switch 14 is a power supply switch different from a main power supply switch (not depicted) provided to the control apparatus 1 and allowing simple switching between supply and cutoff of electric power from the power supply unit 10 to the transmission unit 13 concurrently with a maneuver of the maneuver unit 11. On the other hand, the control signal generation unit 12 is supplied with electric power at all times.

When the communication switch 14 is short-circuited, electric power is supplied to the transmission unit 13, thereby allowing wireless communication by the transmission unit 13. That is, when the communication switch 14 is short-circuited, wireless communication by the transmission unit 13 is enabled. Thus, a short-circuited state of the communication switch 14 corresponds to the communication enabled state. When the communication switch 14 is opened, electric power supply to the transmission unit 13 is cut off, thereby not allowing wireless communication by the transmission unit 13. That is, when the communication switch 14 is opened, wireless communication by the transmission unit 13 is disabled. Thus, an open state of the communication switch 14 corresponds to the first communication disabled state.

In the control apparatus 1, the communication switch 14 may be a switch capable of cutting off electric power supply to both of the control signal generation unit 12 and the transmission unit 13. Alternatively, the communication switch 14 may be a switch supplying electric power to the transmission unit 13 at all time and capable of switching between supply and cutoff of electric power to the control signal generation unit 12. In this case, the transmission unit 13 is configured not to transmit the transmit signal St during a period without an input of the control signal Sct from the control signal generation unit 12. In any case, wireless communication by the transmission unit 13 is enabled when the communication switch 14 is short-circuited, and wireless communication by the transmission unit 13 is disabled when the communication switch 14 is opened.

Figure 3A:
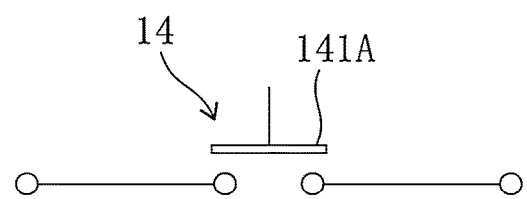
FIGS. 3A and 3B are conceptual diagrams of two examples of a communication switch included in the control apparatus.
Figure 3B:
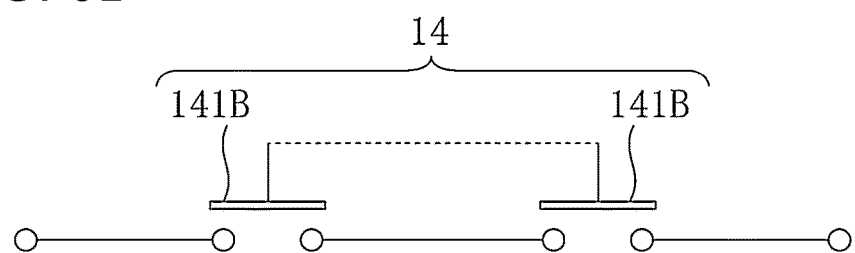

FIGS. 3A and 3B are conceptual diagrams of two examples of the communication switch 14. In FIG. 3A, the communication switch 14 is a contact switch with one contact 141A disposed on a route of electric power supply. The contact 141A is pressed by a pressing member, such as a spring, so as to become in an open state when no maneuver is preformed from outside.

In FIG. 3B, the communication switch 14 is a contact switch with two contacts 141B disposed on a route of electric power supply. The two contacts 141B are coupled so as to be both short-circuited with one pressing maneuver on the communication switch 14, and are each pressed by a pressing member, such as a spring, so as to become in an open state when no maneuver is performed from outside. In this contact switch, even if one contact is failed to become in a short-circuited state at all times, switching between supply and cutoff of electric power supply can be performed as long as the other contact normally operates, thereby allowing high safety in operation of the communication switch 14.

According to the above-described structure of the communication switch 14, when the user presses the communication switch 14, the communication switch 14 becomes in the communication enabled state. During a period in which the user continuously presses the communication switch 14 to keep the communication switch 14 in the communication enabled state, electric power is supplied to the transmission unit 13, resulting in wireless communication by the transmission unit 13 being enabled. On the other hand, when the communication switch 14 is released from a pressing maneuver, the communication switch 14 makes a transition to the first communication disabled state. During a period in which the user does no press the communication switch 14 to keep the communication switch 14 in the first communication disabled state, electric power supply to the transmission unit 13 is cut off, resulting in wireless communication by the transmission unit 13 being disabled.

According to the control apparatus 1, when operating the control target 2, the user has to press the communication switch 14 to cause the communication switch 14 to make a transition to the communication enabled state. On the other hand, when the communication switch 14 is released from a pressing maneuver, the communication switch 14 is kept in the first communication disabled state at all times. Therefore, the transmit signal St (including the control signal Sct) is transmitted to the control target 2 only when the user intends to operate the control target 2. On the other hand, when the user does not intend to operate the control target 2, the transmit signal St is not transmitted from the transmission unit 13, and misoperation of the control target 2 due to erroneous transmission from the control target 2 does not occur. Therefore, according to the control apparatus 1, operation safety of the control target 2 can be improved.

<Control Target>

As depicted in FIG. 1, the control target 2 includes a power supply unit 20, an operation unit 21, a reception unit 22, and an operation control unit 23. The power supply unit 20 supplies electric power to each unit of the control target 2.

The operation unit 21 is a mechanical unit, such as a motor, to achieve operation of the control target 2, and is controlled by the operation control unit 23. By way of example, the operation unit 21 is a driving mechanism unit to achieve running of the control target 2. Note that any of various mechanism units not limited to the above may be applied to the operation unit 21.

The reception unit 22 receives the transmit signal St from the transmission unit 13 of the control apparatus 1, constructs a receive signal Sr based on the received transmit signal St, and outputs the receive signal Sr. Specifically, the reception unit 22 receives the transmit signal St as divided into a plurality of packets. Here, communication quality for each packet is easily secured. Then, the reception unit 22 constructs the receive signal Sr from the plurality of received packets so that its packet array is identical to the packet array of the transmit signal St as divided. Thus, the receive signal Sr includes a control signal Scr as corresponding to the control signal Sct in the transmit signal St. When the construction of the receive signal Sr is normally performed, the control signal Scr matches the control signal Sct.

The operation control unit 23 controls the operation unit 21 based on the control signal Scr included in the receive signal Sr. Here, if the control signal Scr and the control signal Sct match each other, normal operation of the control target 2 in accordance with the control signal Sct from the control apparatus 1 is achieved.

[2] Second Embodiment

As a second embodiment, the communication switch 14 may be a switch capable of achieving three states further including a second communication disabled state. Here, the second communication disabled state is a state that can be taken by the communication switch 14 and is further set to disable wireless communication by the transmission unit 13.

Figure 4A:
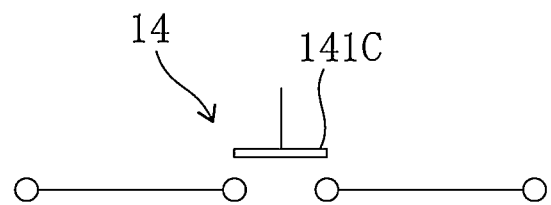
FIGS. 4A to 4C are conceptual diagrams of three states achieved by a communication switch in a second embodiment.
Figure 4B:
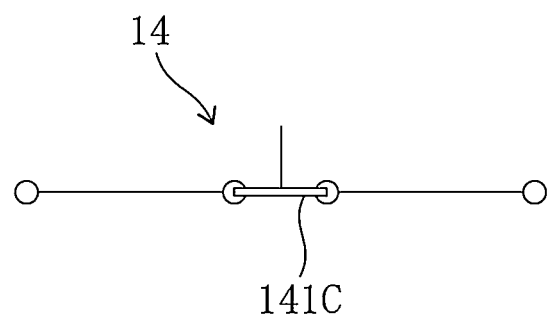
Figure 4C:
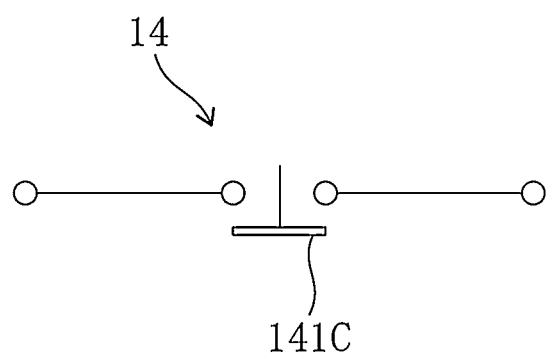

FIGS. 4A to 4C are conceptual diagrams of three states achieved by the communication switch 14 in the second embodiment. Specifically, FIGS. 4A to 4C depict the first communication disabled state, the communication enabled state, and the second communication disabled state, respectively.

The communication switch 14 may be a contact switch with one contact 141C disposed on a route of electric power supply. The contact 141C is pressed by a pressing member, such as a spring, so as to be in an open state (refer to FIG. 4A) when no maneuver is performed from outside. A pressing maneuver on the communication switch 14 (pressing maneuver at a first stage) causes the contact 141C to become in a short-circuited state (refer to FIG. 4B), and a further pressing maneuver (pressing maneuver at a second stage) causes the contact 141C to become in an open state again (refer to FIG. 4C).

According to the communication switch 14 as described above, electric power supply to the transmission unit 13 is cut off in both cases in which the communication switch 14 is released from the pressing maneuver and in which a further pressing maneuver (additional maneuver) is added to the communication switch 14, resulting in wireless communication by the transmission unit 13 being disabled. Therefore, wireless communication by the transmission unit 13 is disabled also when the user perceives some danger when operating the control target 2 and reflectively presses the communication switch 14. Thus, according to the control apparatus 1 in the second embodiment, operation safety of the control target 2 can be further improved.

[3] Third Embodiment

Figure 5:
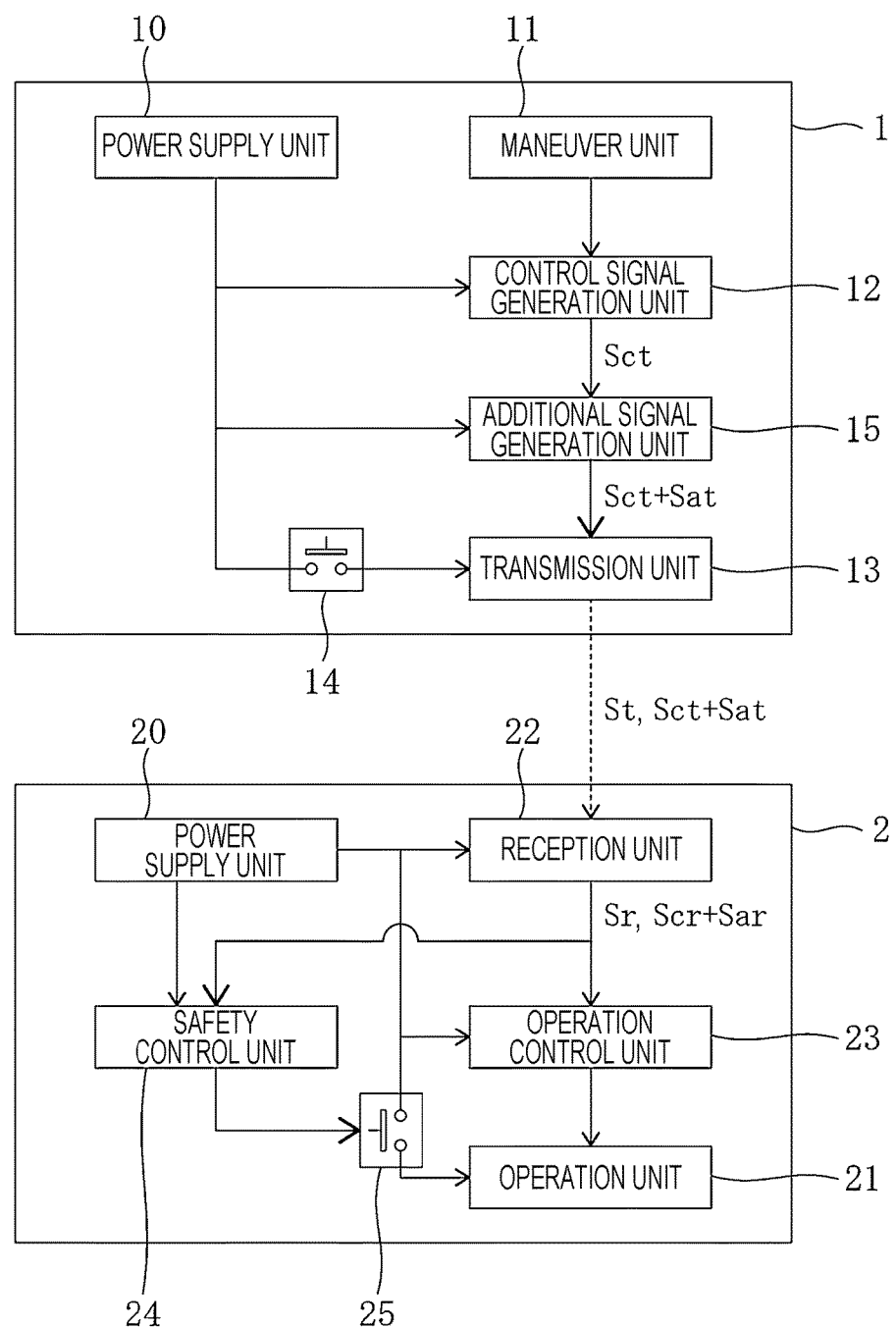
FIG. 5 is a block diagram conceptually depicting a control system according to a third embodiment.

FIG. 5 is a block diagram conceptually depicting a control system according to a third embodiment. As depicted in FIG. 5, in the third embodiment, the control apparatus 1 may further include an additional signal generation unit 15, and the control target 2 may further include a safety control unit 24 and a safety switch 25.

In the control apparatus 1, the additional signal generation unit 15 generates an additional signal Sat corresponding to the control signal Sct generated by the control signal generation unit 12. In the present embodiment, the additional signal Sat includes data regarding a generation time of the control signal Sct as additional information to the control signal Sct. An example of this additional information is a time stamp. The additional signal Sat is not limited to the generation time, and may include various additional information which can distinguish each control signal Sct from another control signal Sct, such as a sequence number indicating a sequence of generation of the control signals Sct.

The additional signal generation unit 15 then adds the generated additional signal Sat to the control signal Sct corresponding to this additional signal Sat. Specifically, the additional signal generation unit 15 generates one new data string by adding the data string of the additional signal Sat subsequently to the data string of the control signal Sct.

As will be described further below, the additional signal Sat is used for the control target 2 to determine reliability of the control signal Scr in the receive signal Sr. Thus, the additional signal Sat may be kept as the same data string without being deformed in the course of communication. Thus, the additional signal Sat may have a data amount that can be accommodated in one packet, where communication quality tends to be secured.

The transmission unit 13 transmits the transmit signal St including the control signal Sct with the additional signal Sat added thereto (the above-described new data string) to the control target 2 via wireless communication. That is, the transmission unit 13 transmits the transmit signal St including the control signal Sct and the additional signal Sat corresponding to the control signal Sct to the control target 2. The process of generating the above-described new data string may be performed by the transmission unit 13 in place of the additional signal generation unit 15.

In the control target 2, the reception unit 22 receives the transmit signal St as divided into a plurality of packets, and constructs the receive signal Sr from the plurality of received packets so that its packet array is identical to the packet array of the transmit signal St as divided. With this, the receive signal Sr includes a control signal Scr and an additional signal Sar as corresponding to the control signal Sct and the additional signal Sat, respectively, in the transmit signal St. In one mode, when the additional signal Sat is transmitted as being accommodated in one packet, the additional signal Sar in the receive signal Sr tends to match the additional signal Sat.

When some anomaly (such as a failure) occurs in the reception unit 22, there may be a case where the reception unit 22 repeatedly outputs the previously-obtained receive signal Sr although not receiving the transmit signal St from the control apparatus 1. In this case, even if transmission of the transmit signal St from the control apparatus 1 is stopped, the operation control unit 23 causes the operation unit 21 to perform the same operation based on the control signal Scr in the receive signal Sr repeatedly outputted from the reception unit 22, thereby causing misoperation of the control target 2.

In the present embodiment, the safety control unit 24 determines, based on the additional signal Sar in the receive signal Sr, whether to use the control signal Scr in the receive signal Sr for controlling the operation unit 21.

Specifically, when the additional signal Sar includes the generation time of the corresponding control signal Sct as additional information, the safety control unit 24 compares the time at the time of determination at the safety control unit 24 and the generation time indicated by the additional signal Sar to determine whether a time difference therebetween is equal to or larger than a predetermined value. Here, the predetermined value may be slightly larger than the time taken for signal transmission from generation of the control signal Sct to determination by the safety control unit 24. With this predetermined value being set, if the time difference is smaller than the predetermined value, it can be determined that the time difference is a time taken for signal transmission. In this case, the control signal Scr in the receive signal Sr corresponds to the control signal Sct generated immediately previously. On the other hand, if the time difference is equal to or larger than the predetermined value, that time difference is longer than the time for signal transmission, and it can be determined that the receive signal Sr outputted from the reception unit 22 has been previously obtained. In this case, some anomaly (such as a failure) has occurred in the reception unit 22.

Thus, when determining that the time difference is equal to or larger than the predetermined value, the safety control unit 24 determines, based on this determination, not to use the control signal Scr in the receive signal Sr, and forcibly stops the operation of the operation unit 21. Specifically, the safety control unit 24 cuts off electric power supply to the operation unit 21 by opening the safety switch 25, thereby forcibly stopping the operation of the operation unit 21. On the other hand, when determining that the time difference is not equal to or larger than the predetermined value, the safety control unit 24 determines, based on this determination, to use the control signal Scr in the receive signal Sr, and causes the operation of the operation unit 21 to continue.

In another example, the safety control unit 24 may determine whether the additional signal Sar (which may include any additional information that can distinguish the control signal Sct, such as a generation time, sequence number, or the like) in the receive signal Sr is identical to the additional signal Sar used at any previous determination by, for example, comparing data strings of these additional signals Sar. Here, if the compared two additional signals Sar are identical to each other, it can be determined that the same receive signal Sr is repeatedly outputted from the reception unit 22. In this case, some anomaly (such as a failure) has occurred in the reception unit 22.

Thus, when determining that the compared two additional signals Sar are identical to each other, the safety control unit 24 determines, based on this determination, not to use the control signal Scr in the receive signal Sr, and forcibly stops the operation of the operation unit 21. On the other hand, when determining that the compared two additional signals Sar are not identical to each other, the safety control unit 24 determines, based on this determination, to use the control signal Scr in the receive signal Sr, and causes the operation of the operation unit 21 to continue.

According to the control system of the third embodiment, if some anomaly (such as a failure) occurs in the reception unit 22 of the control target 2 and the same receive signal Sr is repeatedly outputted from the reception unit 22, the operation of the operation unit 21 can be forcibly stopped. Thus, it is possible to avoid misoperation of the control target 2 that is not deterred by a maneuver (disabling wireless communication) from the control apparatus 1, resulting in further improving operation safety of the control target 2.

[4] Fourth Embodiment

When the receive signal Sr is normally constructed at the reception unit 22, the control signal Scr matches the control signal Sct. On the other hand, if an anomaly occurs in constructing the receive signal Sr at the reception unit 22, the packet array (data string) of the control signal Scr may be different from the packet array (data string) of the control signal Sct. Moreover, even if the receive signal Sr is normally constructed at the reception unit 22, the data string of the control signal Scr may be different from the data string of the control signal Sct because noise is superposed on the transmit signal St at the time of communication. The difference between these data strings may cause misoperation of the control target 2.

In the above-described control system of the third embodiment, the following control may be performed. In the control apparatus 1, the additional signal generation unit 15 generates the additional signal Sat from the control signal Sct generated by the control signal generation unit 12 by a predetermined arithmetic operation scheme. Here, as the predetermined arithmetic operation scheme, for example, an arithmetic operation scheme for a data string used in cyclic redundancy check (CRC) can be applied. As the predetermined arithmetic operation scheme, it is possible to apply any of various arithmetic operation schemes capable of obtaining an arithmetic operation value for distinguishing the control signal Sct from another control signal Sct by performing arithmetic operation on the control signal Sct.

As with the third embodiment, the additional signal Sat is used for the control target 2 to determine reliability of the control signal Scr in the receive signal Sr. Thus, the additional signal Sat may be kept as the same data string without being deformed in the course of communication. Thus, the additional signal Sat may have a data amount that can be accommodated in one packet, where communication quality tends to be secured.

In the control target 2, by using the above-described predetermined arithmetic operation scheme, the safety control unit 24 may generate a new additional signal Sax from the control signal Scr included in the receive signal Sr. The safety control unit 24 may then determine whether the newly-generated additional signal Sax matches the additional signal Sar included in the same receive signal Sr which includes the control signal Scr used to generate the additional signal Sax by, for example, comparing the data strings of these additional signals. Here, if the additional signal Sax does not match the additional signal Sar, the control signal Scr in the receive signal Sr does not match the control signal Sct generated by the control apparatus 1. In this case, some anomaly has occurred in construction of the receive signal Sr at the reception unit 22 or noise has been superposed on the transmit signal St at the time of communication.

Thus, when determining that the additional signal Sax does not match the additional signal Sar, the safety control unit 24 may determine, based on this determination, not to use the control signal Scr in the receive signal Sr, and may forcibly stop the operation of the operation unit 21. On the other hand, when determining that the additional signal Sax matches the additional signal Sar, the safety control unit 24 may determine, based on this determination, to use the control signal Scr in the receive signal Sr, and may cause the operation of the operation unit 21 to continue.

According to the control system of the fourth embodiment, when the data string of the control signal Scr is different from the data string of the control signal Sct due to some reason, the operation of the operation unit 21 can be forcibly stopped. Thus, it is possible to avoid misoperation of the control target 2 that is not deterred by a maneuver (disabling wireless communication) from the control apparatus 1, resulting in further improving operation safety of the control target 2.

[5] Fifth Embodiment

Figure 6:
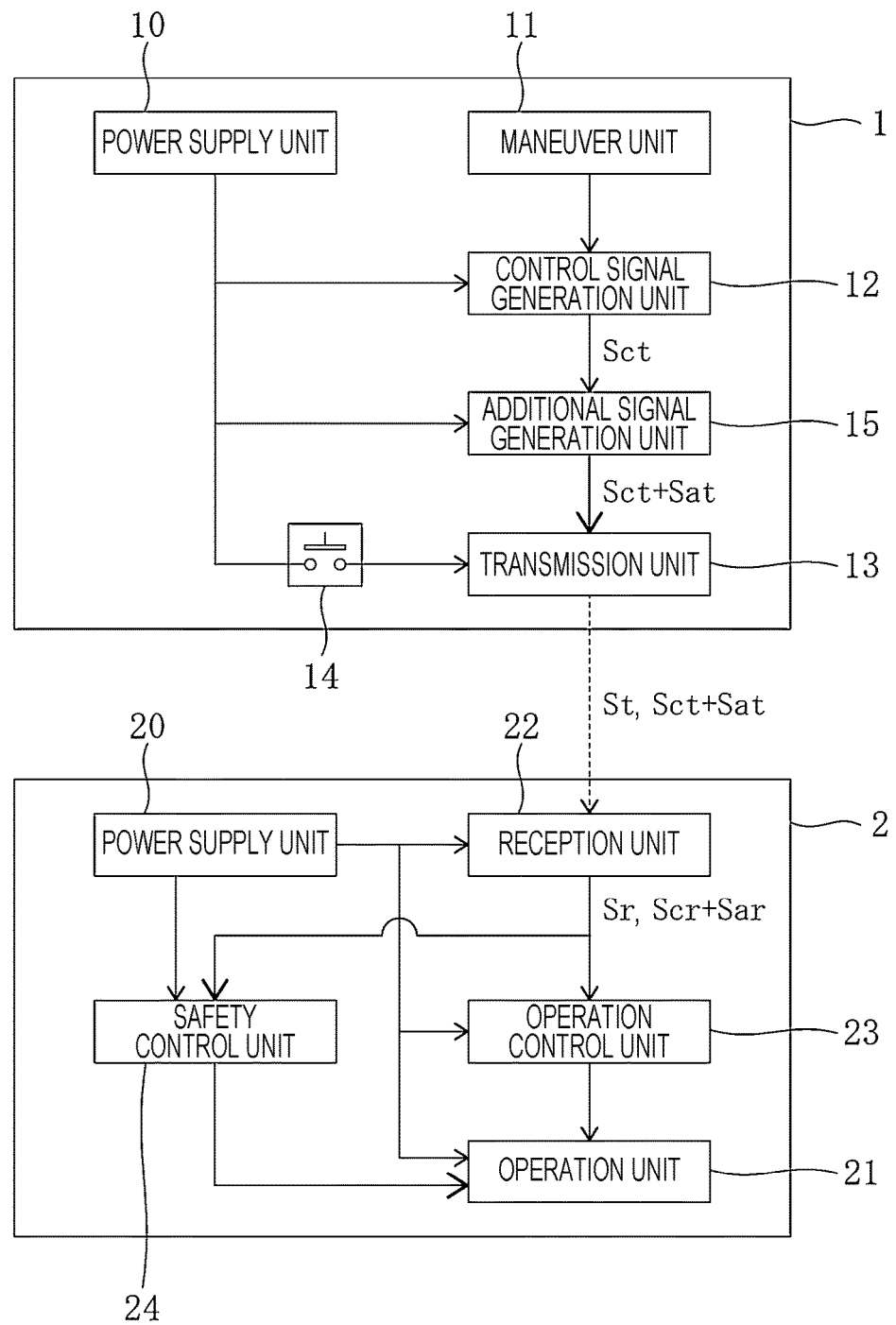
FIG. 6 is a block diagram conceptually depicting a control system according to a fifth embodiment.

FIG. 6 is a block diagram conceptually depicting a control system according to a fifth embodiment. As depicted in FIG. 6, the safety control unit 24 may directly control the operation of the operation unit 21 in accordance with the determination of the safety control unit 24. Specifically, when determining not to use the control signal Scr in the receive signal Sr, the safety control unit 24 may directly and forcibly stop the operation of the operation unit 21.

As another example of the fifth embodiment, in place of forcibly stopping the operation of the operation unit 21, the safety control unit 24 may cause the operation unit 21 to forcibly perform predetermined operation not limited to stopping but capable of securing safety.

[6] Other Embodiments

The control system may have a structure capable of selectively performing safety control described in each of the third to fifth embodiments in accordance with the type (mode) of anomaly that can occur in the control target 2 (mainly in the reception unit 22). Also, the control performed in the entire control system may be performed as a series of methods.

The control apparatus 1 may have a structure without having the maneuver unit 11. In this structure, as the control signal generation unit 12, a unit capable of autonomously generating the control signal Sct may be applied. In this case, the control signal generation unit 12 autonomously generates the control signal Sct during a period in which the communication switch 14 is kept in the communication enabled state by a user's maneuver.

In the control target 2, the operation control unit 23 and the safety control unit 24 can be configured of various control processing apparatuses such as a central processing unit (CPU) and microcomputer. Also, the processes performed by the reception unit 22, the operation control unit 23, and the safety control unit 24 may be achieved by causing the control target 2 to execute programs corresponding to the respective processes as associated with one another, or by causing the control target 2 to execute a series of programs corresponding to an entire process. These programs may be stored in a storage medium (for example, flash memory or the like) as being in a readable state, or may be stored in a storage unit (not depicted) included in the control target 2.

As a mode of adding an additional signal to a control signal, the additional signal may be added to a head or tail end of the control signal, or the control signal and the additional signal may be reconfigured in a predetermined format. Furthermore, these control signal and additional signal may be encoded into a data string. In these cases, the control signal and the additional signal are obtained by performing decoding on a reception side.

It is to be understood that the above descriptions of the embodiments are exemplarily made in all aspects and are not restrictive. The scope of the present disclosure is indicated not by the above-described embodiments but by the scope of the claims for patent. Furthermore, the scope of the present disclosure is intended to include all modifications within the sense and scope of the equivalents of the scope of the claims for patent.

The present disclosure contains subject matter related to that disclosed in Japanese Priority Patent Application JP 2016-173791 filed in the Japan Patent Office on Sep. 6, 2016, the entire contents of which are hereby incorporated by reference.

What is claimed is:

1. A control system comprising:
    a control apparatus; and
    a control target controlled by the control apparatus, wherein
    the control apparatus includes:
        a control signal generation unit which generates a control signal;
        an additional signal generation unit which generates an additional signal corresponding to the control signal generated by the control signal generating unit, the additional signal corresponding to the control signal being generated from by a predetermined arithmetic operation scheme;
        a transmission unit which transmits a transmit signal including the control signal and the additional signal corresponding to the control signal to the control target via wireless communication; and
        a communication switch which has a first communication disabled state and a communication enabled state, makes a transition from the first communication disabled state to the communication enabled state by a maneuver from outside, and returns to the first communication disabled state when released from the maneuver, the communication switch enabling wireless communication by the transmission unit during a period of being kept in the communication enabled state, and disabling wireless communication by the transmission unit during a period of being kept in the first communication disabled state, and
    the control target includes:
        an operation unit;
        a reception unit which receives the transmit signal from the transmission unit and outputs a receive signal;

an operation control unit which controls the operation unit based on the control signal included in the receive signal as corresponding to the control signal in the transmit signal; and a safety control unit which generates a new additional signal from the control signal in the receive signal by the predetermined arithmetic operation scheme, determines whether the newly-generated additional signal matches the additional signal included in the receive signal which includes the control signal used to generate the newly-generated additional signal, and forcibly controls operation of the operation unit when determining that the newly-generated additional signal does not match the additional signal.

2. The control apparatus according to claim 1, wherein the communication switch further has a second communication disabled state, makes a transition from the communication enabled state to the second communication disabled state by an additional maneuver from outside, and disables wireless communication by the transmission unit during a period of being kept in the second communication disabled state.

* * * * *